United States Patent
Lai et al.

(10) Patent No.: US 10,884,101 B2
(45) Date of Patent: Jan. 5, 2021

(54) CROSSTALK DETECTION AND COMPENSATION

(71) Applicant: MOTOROLA MOBILITY LLC, Chicago, IL (US)

(72) Inventors: Zenhua Lai, Chicago, IL (US); Feng Guo, Lincolnshire, IL (US); Peirong Fu, Northbrook, IL (US)

(73) Assignee: Motorola Mobility LLC, Chicago, IL (US)

( * ) Notice: Subject to any disclaimer, the term of this patent is extended or adjusted under 35 U.S.C. 154(b) by 389 days.

(21) Appl. No.: 15/883,400

(22) Filed: Jan. 30, 2018

(65) Prior Publication Data

US 2019/0235049 A1    Aug. 1, 2019

(51) Int. Cl.
| G01S 7/28 | (2006.01) |
| G01S 7/4865 | (2020.01) |
| G01S 17/02 | (2020.01) |
| G01S 13/02 | (2006.01) |
| G01S 7/4861 | (2020.01) |
| G01S 7/487 | (2006.01) |

(52) U.S. Cl.
CPC .......... *G01S 7/2813* (2013.01); *G01S 7/4861* (2013.01); *G01S 7/4865* (2013.01); *G01S 7/4876* (2013.01); *G01S 13/02* (2013.01); *G01S 17/02* (2013.01)

(58) Field of Classification Search
CPC .......... G01S 7/497; G01S 17/10; G01S 7/487; G01S 7/491; G01C 3/08
See application file for complete search history.

(56) References Cited

U.S. PATENT DOCUMENTS

| 2002/0005778 A1* | 1/2002 | Breed | G08G 1/167 340/435 |
| 2019/0004158 A1* | 1/2019 | Simard-Bilodeau | G01S 17/04 |

OTHER PUBLICATIONS

Kuznetsova, Alina et al., "On Calibration of a Low-cost Time-of-Flight Camera", Institute fuer Informationsverarbeitung, Leibniz University Hannover, Mar. 2015.
Lindner, Marvin et al., "Time-of-Flight Sensor Calibration for Accurate Range Sensing", Computer Vision and Image Understanding 114, pp. 1318-1328, Aug. 2010.
Holmlund, Jonas, "Characterization and Compensation of Stray Light Effects in Time of Flight Based Range Sensors", Master's Thesis in Engineering Physics, Department of Physics, Umea University, 2013.
STlife, augmented Optical Sensing: 1D to 3D Using Time-of-Flight Technology, Shaping the Future of MEMS & Sensors, Sep. 10, 2013.

* cited by examiner

*Primary Examiner* — Luke D Ratcliffe
(74) *Attorney, Agent, or Firm* — Yudell Isidore PLLC

(57) ABSTRACT

A method for determining that a received signal is crosstalk. The method includes receiving, from a time-of-flight sensor of a device, a distance and a plurality signal intensity values. The method further includes determining, by the device, whether the distance is less than a near-field threshold. The method further includes, in response to determining that the distance is less than the near-field threshold, determining whether the distance is associated with crosstalk based, at least in part, on the plurality of signal intensity values. The method further includes, in response to determining that the distance is associated with crosstalk, indicating that the distance is associated with crosstalk.

20 Claims, 7 Drawing Sheets

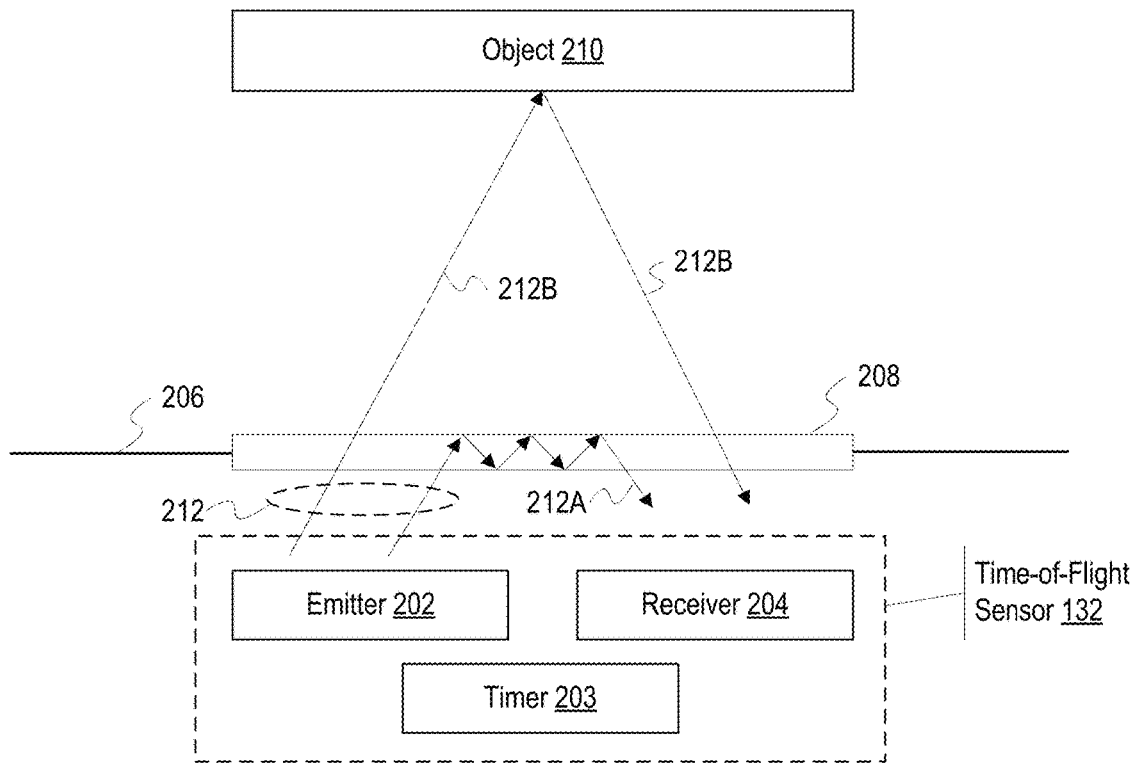
*FIG. 2*
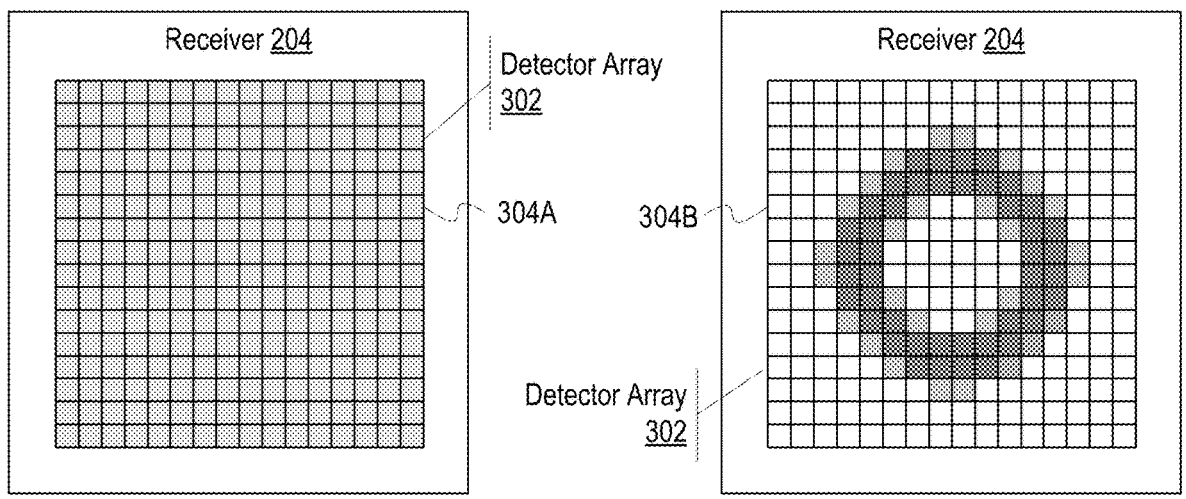
*FIG. 3A*  *FIG. 3B*

CROSSTALK DETECTION AND COMPENSATION

BACKGROUND

1. Technical Field

The present disclosure generally relates to electronic devices having distance sensors and in particular to detecting and compensating for crosstalk associated with time-of-flight sensors.

2. Description of the Related Art

Many modern personal devices, such as cellular phones, are equipped with a distance sensor that determines the distance between the distance sensor (and thus, device) and an object/surface in front of the distance sensor. To determine the distance, the distance sensor emits a signal (e.g., infrared light) and detects the signal after the signal is reflected off the surface. The distance sensor can determine the distance between the distance sensor and the surface based, at least in part, on the intensity of the signal and the length of time between emitting the signal and detecting the signal. A distance sensor that uses the length of time between emitting the signal and detecting the reflected signal is referred to as a "time-of-flight" sensor.

In some instances, the distance sensor is located behind a cover made of a transparent material (e.g., glass, plastic, etc.). Although transparent, most transparent materials have internal reflections, causing some portion of a signal to reflect within the material instead of passing through the cover. Some portion of the internally reflected signal may exit the cover and be detected by the distance sensor, resulting in an inaccurate time-of-flight reading referred to as "crosstalk."

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 depicts an example configuration of the time-of-flight sensor, according to one or more embodiments;

FIG. 3A depicts an example detector activation pattern corresponding to the reception of a crosstalk signal;

FIG. 3B depicts an example detector activation pattern corresponding to the reception of a near-field signal;

DETAILED DESCRIPTION

Figure 1:
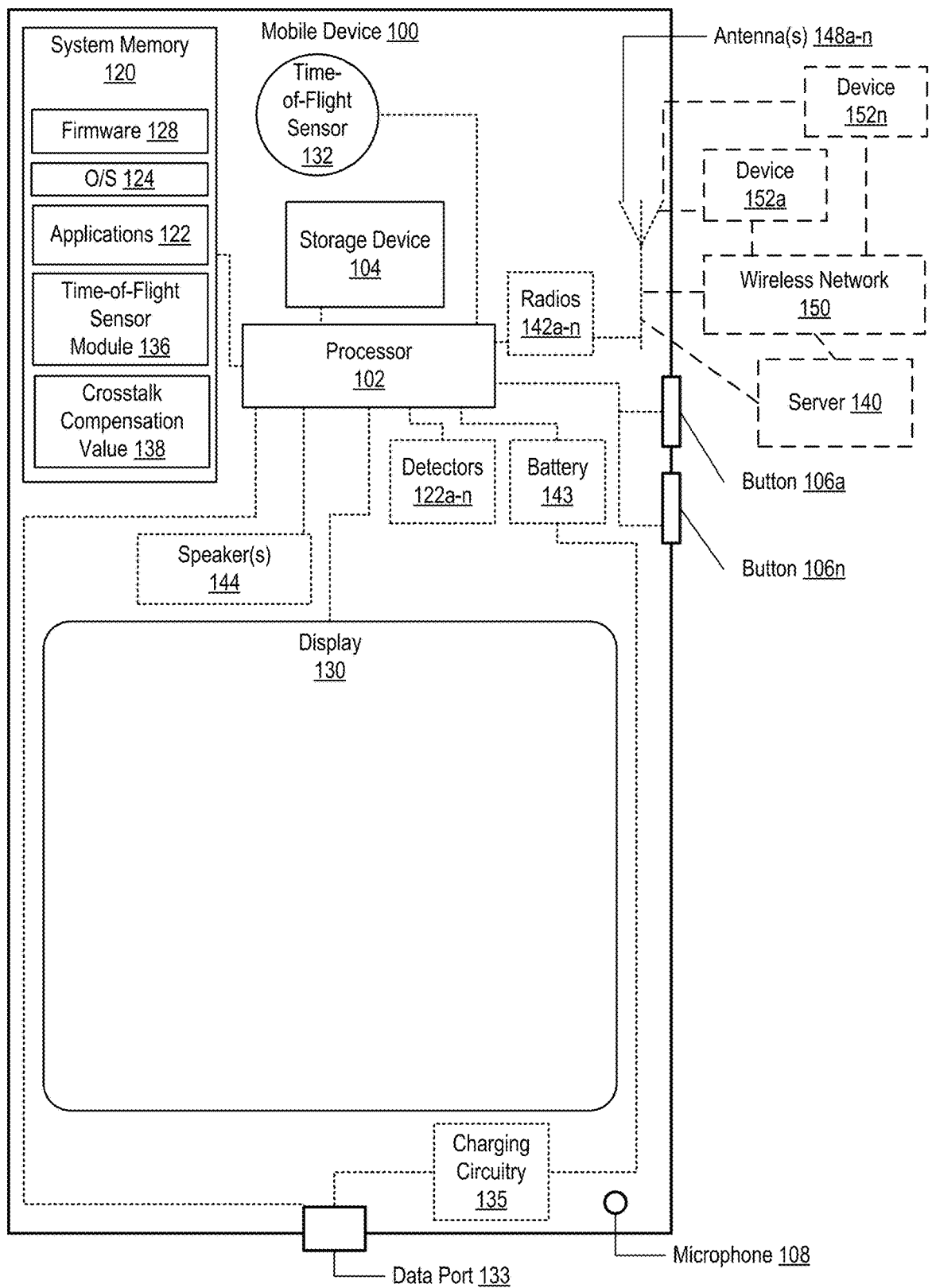
FIG. 1 depicts an example mobile device within which various aspects of the disclosure can be implemented, according to one or more embodiments.

The illustrative embodiments provide a method, a device, and a computer program product for identifying crosstalk signals associated with a time-of-flight sensor comprising a plurality of detectors. The method includes receiving, from a time-of-flight sensor of a device, a first distance and a first plurality of signal intensity values. Each of the first plurality of signal intensity values is associated with a respective one of the plurality of detectors. The method further includes determining, by the device, whether the first distance is less than a near-field threshold. The method further includes, in response to determining that the first distance is less than the near-field threshold, determining whether the first distance is associated with crosstalk based, at least in part, on the first plurality of signal intensity values. The method further includes, in response to determining that the first distance is associated with crosstalk, indicating that the first distance is associated with crosstalk. The method further includes receiving, from the time-of-flight sensor, a second distance and a second plurality of signal intensity values. Each of the second plurality of signal intensity values is associated with a respective one of the plurality of detectors. The method further includes determining, by the device, whether the second distance is less than the near-field threshold. The method further includes, in response to determining that the second distance is less than the near-field threshold, determining whether the second distance is associated with crosstalk based, at least in part, on the second plurality of signal intensity values. The method further includes in response to determining that the second distance is associated with crosstalk, indicating that the second distance is associated with crosstalk.

In one or more embodiments, the method includes generating a plurality of compensated signal intensity values based, at least in part, on a crosstalk compensation value. In one or more embodiments, the method includes increasing the crosstalk compensation value by a crosstalk compensation increment value and/or decreasing the crosstalk compensation value by a crosstalk compensation decrement value. In one or more embodiments, the method includes determining whether a count of the first plurality of signal intensity values having a same order of magnitude is greater than a signal uniformity threshold and determining whether a count of the plurality of detectors that are activated is greater than an activation count threshold.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the following figures and the remaining detailed written description. The above as well as additional objectives, features, and advantages of the present disclosure will become apparent in the following detailed description.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within mobile device 100 are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example mobile device 100 within which various aspects of the disclosure can be implemented, according to one or more embodiments. The mobile device 100 includes a processor 102, a storage device 104, system memory 120, a display 130, and a time-of-flight sensor 132. The mobile device 100 includes a data port 133 coupled with the processor 102, charging circuitry 135, and a battery 143. The mobile device 100 further includes a microphone 108, one or more speakers 144, one or more buttons 106a-n, and one or more detectors 122a-n. The buttons 106a-n may include volume buttons, a power button, a camera shutter button, etc. The one or more detectors 122a-n may include a compass, a light-level sensor, etc. The mobile device 100 further includes radios 142a-n coupled with antennas 148a-n. The radios 142a-n and the antennas 148a-n provide similar functionality to that of a network interface device and, in combination or individually, may be considered a network interface device. In this example, the radios 142a-n and the antennas 148a-n allow the mobile device 100 to communicate wirelessly with one or more devices 152a-n and a server 140 either directly or via a wireless network 150.

The system memory 120 may be a combination of volatile and non-volatile memory, such as random access memory (RAM) and read-only memory (ROM). The system memory 120 can store program code or similar data associated with firmware 128, an operating system 124, applications 122, a time-of-flight sensor module 136, and a crosstalk compensation value 138. Although depicted as being a separate module, the time-of-flight sensor module 136 may also be an application, part of the operating system 124, or part of the firmware 128. Similarly, although depicted as separate from the time-of-flight sensor module 136, the crosstalk compensation value 138 may be part of the time-of-flight sensor module 136. The processor 102 loads and executes program code stored in the system memory 120. Examples of program code that may be loaded and executed by the processor include program code associated with the time-of-flight sensor module 136.

FIG. 2 depicts an example configuration of the time-of-flight sensor 132, according to one or more embodiments. The time-of-flight sensor 132 comprises an emitter 202, a timer 203, and a receiver 204. Cover glass 208 allows a signal 212 emitted by the emitter 202 to pass through the mobile device case 206 of the mobile device 100. The cover glass 208 can be any material that allows the signal 212 emitted from the emitter 202 to pass through the cover glass 208. For example, if the signal 212 is a form of light, various transparent or semi-transparent plastics or glasses may be used for the cover glass 208.

To measure the distance between the time-of-flight sensor 132 (or mobile device 100, by proxy) and a target object 210, the emitter 202 emits the signal 212. A portion of the signal 212, referred to herein as signal 212B, passes through the cover glass 208, reflects off an object 210, passes back through the cover glass 208, and is detected by the receiver 204. A different portion of the signal 212, referred to herein as signal 212A, reflects within the cover glass 208 and exits the cover glass 208 such that it is detected by the receiver 204 without propagating to and reflecting off of an exterior object (i.e., exterior to mobile device 100 and/or the cover glass 208).

The time-of-flight sensor 132 uses the timer 203 to track the amount of time that has elapsed after emitting the signal 212. For example, the timer 203 may output a periodic (e.g., every microsecond) signal that increments a counter. When the timer 203 outputs the periodic signal, the time-of-flight sensor 132 determines whether the receiver 204 is receiving a signal. If the time-of-flight sensor 132 determines that the receiver 204 is receiving the signal, the time-of-flight sensor 132 can determine the amount of elapsed time by multiplying the counter by the rate at which the timer 203 outputs the periodic signal.

The time-of-flight sensor 132 determines the distance between the time-of-flight sensor 132 and the object 210 based, at least in part, on the amount of time that elapses between emitting the signal 212 from the emitter 202 and receiving the signal 212 by the receiver 204. For example, if the signal 212 comprises an electromagnetic wave, the distance is determined by multiplying the speed of the signal (c) by the elapsed time (t) and dividing the resulting value by two, as illustrated in Equation 1, below.

$$\frac{c \times t}{2} \qquad \text{Equation 1}$$

The emitter 202 can vary depending on the desired signal type. For example, if the signal 212 is a light signal, the emitter 202 can be a laser, a light emitting diode, etc. Similarly, the receiver 204 can vary depending on the type of signal. The signal 212 can be any type of signal usable to determine distances as described herein. For example, the signal 212 can comprise an electromagnetic wave, such as a radio wave or light, any type of suitable particle (e.g., electron), sound and/or pressure waves, etc.

The examples described herein refer to a near-field signal, a far-field signal, and crosstalk. A near-field signal is any signal that is reflected off an object that is less than a distance corresponding to a near-field threshold. A far-field signal is any signal that is reflected off an object that is greater than or equal to the near-field threshold. Crosstalk is a near-field signal that meets certain criteria, as described below. The particular near-field threshold may vary between implementations. For example, a first time-of-flight sensor may have a near-field threshold distance of 65 millimeters and a second time-of-flight sensor may have a near-field threshold distance of 30 millimeters.

FIGS. 3A and 3B depict an example configuration of the receiver 204 and example detector activation patterns. In particular, FIG. 3A depicts an example detector activation pattern corresponding to the reception of a crosstalk signal and FIG. 3B depicts an example detector activation pattern corresponding to the reception of a near-field signal. FIGS. 3A and 3B depict a detector array 302 of receiver 204. The detector array 302 comprises an m×n matrix of detectors designed to detect signals of the type emitted by the emitter 202. For example, if the emitter 202 emits infrared light, the detector array 302 comprises detectors at least capable of detecting photons with a wavelength of 700 nanometers to one millimeter (or a subset thereof). Each square of detector array 302 corresponds to an individual detector.

A particular detector in the detector array 302 is considered activated when the particular detector detects a signal with an intensity greater than a particular threshold (hereinafter "signal threshold"). In FIGS. 3A and 3B, the intensity of the signal detected by a particular detector is indicated by the shade of the sensor, with darker shades corresponding to a signal of greater intensity and white corresponding to a signal intensity below the signal threshold.

In FIG. 3A, the detector array 302 depicts an example detector activation pattern corresponding to crosstalk (hereinafter "crosstalk activation pattern"). In this example, the crosstalk activation pattern is characterized by a large percentage of activated detectors and a uniform intensity across the activated detectors. The example depicted in FIG. 3A has been simplified by depicting all detectors of the detector array 302 as being activated and having the same intensity. In an actual implementation however, some detectors may not be activated and there may be some variance in intensity. Additionally, the particular criteria defining the crosstalk activation pattern can vary between implementations. For example, in an implementation with 256 detectors (e.g., a 16×16 matrix), a crosstalk activation pattern may be defined as occurring when 200 or more of the detectors are activated and the detected signal intensities for each activated detector have the same order of magnitude. As used herein, the order of magnitude of a signal intensity is the logarithm (base-10) of a measure of the signal intensity rounded to the nearest whole number. Factors that may cause the criteria for a crosstalk activation pattern to vary include properties of the particular cover glass 208 used and/or properties of the emitter 202.

In an implementation in which the crosstalk activation pattern criteria include a uniform intensity across the activated detectors, the time-of-flight sensor module 136 may determine that the activated detectors have a uniform intensity by comparing a count of the activated detectors having signal intensities of the same magnitude to a signal uniformity threshold. In particular, the time-of-flight sensor module 136 may determine whether the count of the activated detectors having signal intensities of the same magnitude is greater than the signal uniformity threshold. The signal uniformity threshold can be used to effectively filter out anomalous detectors that vary in magnitude by setting the signal uniformity threshold to a value less than the total number of activated detectors. For example, if the activated detector threshold is 200, the signal uniformity threshold may be 190, allowing for ten detectors to have signal intensities different from the other activated detectors. Some implementations may have a signal uniformity threshold that is the same as the activated detector threshold. Further, the signal uniformity threshold may not be a constant value, but may be determined dynamically. For example, the signal uniformity threshold may be a percentage of the number of activated detectors.

In FIG. 3B, the detector array 302 depicts an example detector activation pattern corresponding to a non-crosstalk signal (hereinafter "non-crosstalk activation pattern"). The non-crosstalk activation pattern can be differentiated from the crosstalk activation pattern by the lower number of activated detectors in the detector array 302 and a greater variation in signal intensity (e.g., with signal intensities having different orders of magnitude). As with the crosstalk activation pattern, the non-crosstalk activation pattern criteria can vary between implementations and may vary based, at least in part, on properties of the particular cover glass 208 used and/or properties of the emitter 202.

Figure 4A:
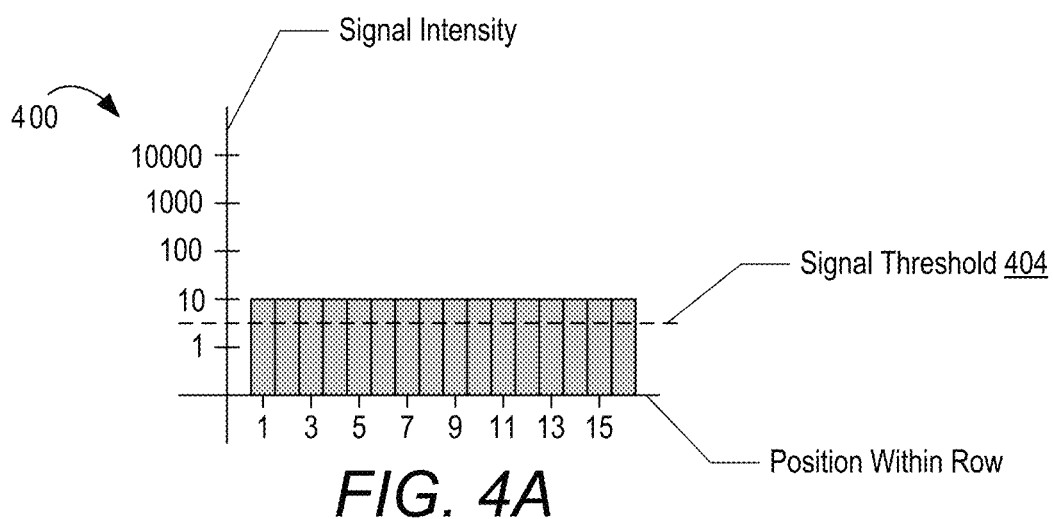
FIG. 4A depicts a graph of signal intensities corresponding to a particular row of a crosstalk activation pattern.

FIG. 4A depicts a graph 400 of signal intensities corresponding to the sixth row (identified by reference numeral 304A) of the crosstalk activation pattern depicted in FIG. 3A. The x-axis of the graph 400 corresponds to each detector in the row 304A, and the y-axis of the graph 400 corresponds to the signal intensity of the associated detector. The signal threshold 404 (i.e., the signal intensity that determines whether a detector is activated or not) is depicted by the dashed line.

The signal intensity units used in this example are generic. The particular units used by actual detectors can vary. For example, detectors may generate an electrical signal based, at least in part, on the signal intensity of the received signal. Thus, the units may be a measurement associated with the generated electrical signal, such as volts or amperes. For detectors that detect photons, the units may be a count of the photons, which may be determined based, at least in part, on an electrical signal by the detectors. For example, the voltage generated by a particular detector may be proportional to the number of photons received by the detector. Thus, x volts may correspond toy photons and 2x volts may correspond to 2y photons. In some implementations, the signal intensity units may correspond to a time period as well. For example, a photon count may be determined by counting the photons that are received by the detectors in a microsecond.

The graph 400 shows that each detector in the row is activated and that each detector has a signal intensity of 10, corresponding to the crosstalk activation pattern depicted in FIG. 3A. As noted above, the example crosstalk activation pattern shows each detector as detecting the same signal intensity, but in an actual implementation, there may be variations between detectors. The example intensity criterion for the crosstalk activation pattern example depicted in FIG. 3A is that the signal intensity for each detector has the same order of magnitude, not necessarily the exact same signal intensity.

Figure 4B:
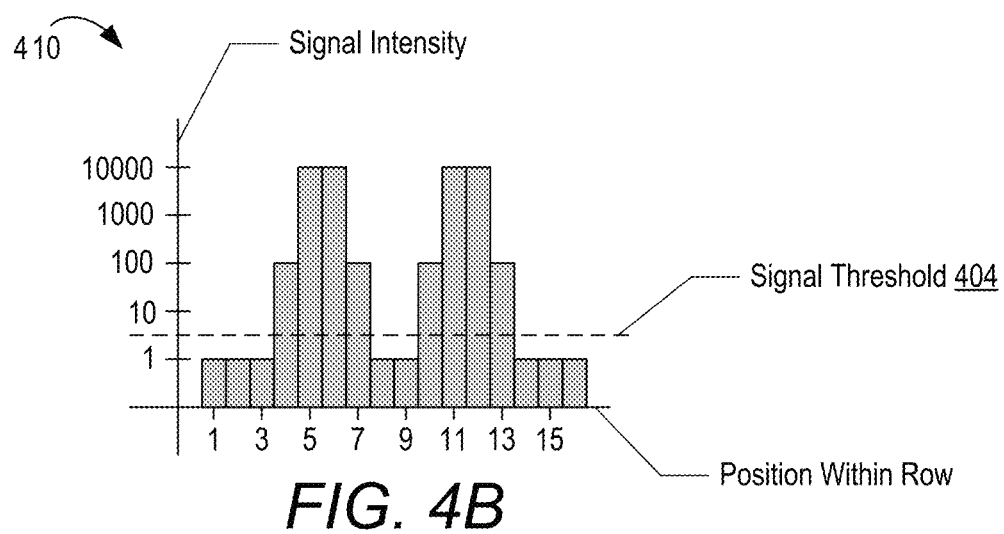
FIG. 4B depicts a graph of signal intensities corresponding to a particular row of a non-crosstalk activation pattern.

FIG. 4B depicts a graph 410 of signal intensities corresponding to the sixth row (identified by reference numeral 304B) of the non-crosstalk activation pattern depicted in FIG. 3B. The x-axis of the graph 410 corresponds to each detector in the row 304B and the y-axis of the graph 410 corresponds to the signal intensity of the associated detector. The signal threshold 404 (i.e., the signal intensity that determines whether a detector is activated or not) is depicted by the dashed line.

The graph 410 shows that detectors 1-3, 8, 9, and 14-16 are receiving a signal with a signal intensity below the signal threshold and are thus not considered activated. The graph 410 shows that detectors 4, 7, 10, and 13 have a signal intensity of 100 and are thus considered activated. The graph 410 shows that detectors 5, 6, 11, and 12 have a signal intensity of 10000 and are thus considered activated.

After determining the signal intensity associated with the signal received by the detectors, the time-of-flight sensor 132 determines compensated signal intensity values. To determine the compensated signal intensity values, the time-of-flight sensor 132 applies the crosstalk compensation value 138 to the signal intensity values associated with each of the detectors. The crosstalk compensation value 132, as described in more detail below, is used to decrease the impact of crosstalk on a received signal. The particular techniques used to apply the crosstalk compensation value can vary between time-of-flight sensors. Further, the time-of-flight sensor 132 may normalize the signal intensity values. For example, the time-of-flight sensor 132 may output compensated signal intensity values as an eight-bit value (corresponding to integer values from zero to 255). Thus, in an implementation with detectors that count the number of photons received, the time-of-flight sensor 132 may convert the count of photons to a value from zero to 255.

As noted above in relation to FIGS. 3A and 3B, the example crosstalk activation pattern includes a high number of activated detectors with signal intensities having the same order of magnitude while the example non-crosstalk activation pattern includes a lower number of activated detectors than the crosstalk activation pattern with signal intensities that have different orders of magnitude. Because the characteristics of the crosstalk activation pattern and the non-crosstalk activation pattern differ, the time-of-flight sensor module 136 can determine whether a signal is crosstalk based, at least in part, on the differences between the characteristics. For example, the time-of-flight sensor module 136 may determine whether a signal is crosstalk based, at least in part, on the distance and signal intensity values.

Crosstalk is a type of additive noise or interference. Thus, when a crosstalk signal and non-crosstalk signal are received, the intensity of the non-crosstalk signal is increased by the intensity of the crosstalk signal. However, because crosstalk is additive, the signal intensity of a received signal can be adjusted using the crosstalk compensation value 138 to effectively remove the crosstalk from the signal. Optimally, the crosstalk compensation value 138 would be equal to the intensity of the crosstalk signal. However, numerous factors may cause the intensity of the crosstalk signal to vary. For example, the intensity of the crosstalk signal may vary based on the particular material used by the cover glass 208, characteristics of the emitter 202, deposits (e.g., dirt, oil, etc.) on the cover glass 208, etc. Some of these factors, such as deposits on the cover glass 208, may cause the intensity of the crosstalk signal to vary over time. However, the time-of-flight sensor module 136 can increase the crosstalk compensation value 138 in response to detecting crosstalk, allowing the crosstalk to be compensated for even as the crosstalk varies over time.

Figure 5A:
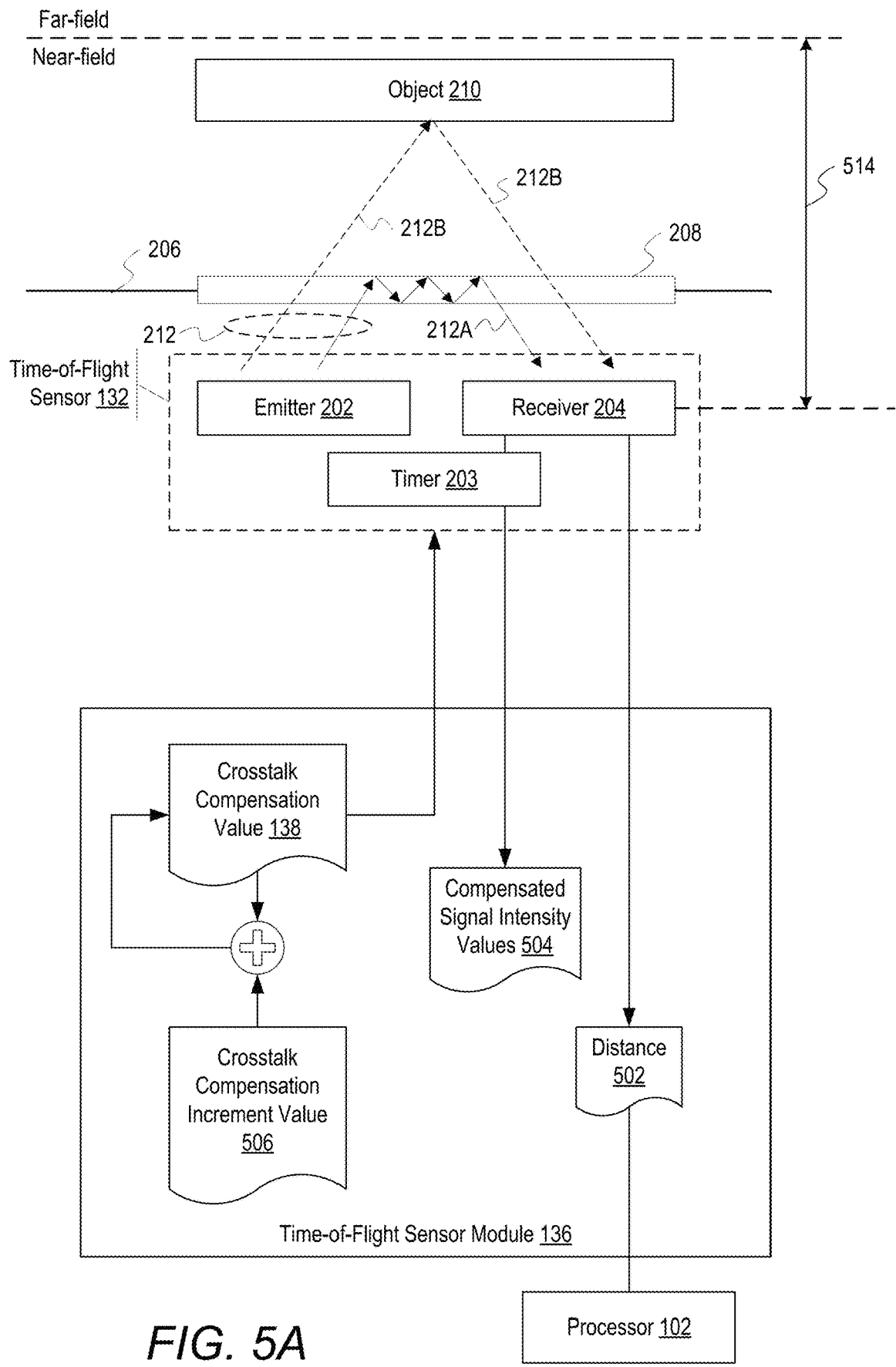
FIG. 5A depicts example operations for identifying crosstalk and updating a crosstalk compensation value, according to one or more embodiments.

FIG. 5A depicts example operations for identifying crosstalk and updating a crosstalk compensation value, according to one or more embodiments. FIG. 5A depicts the processor 102, the time-of-flight sensor 132 (including the emitter 202, the timer 203, and the receiver 204), the mobile device case 206, the cover glass 208, and the object 210. FIG. 5A further depicts the time-of-flight sensor module 136, a crosstalk compensation value 138, and a near-field threshold 514.

During operation, the time-of-flight sensor 132 emits the signal 212 via the emitter 202 and triggers the timer 203. The time-of-flight sensor 132 periodically (e.g., every microsecond) measures the output of the detectors comprising the detector array 302. If any portion of the signal 212 is detected, the time-of-flight sensor 132 measures the intensity of the signal 212 received by each detector and determines a distance, based, at least in part, on the amount of time elapsed between emitting the signal 212 and detecting the signal 212. For a time-of-flight sensor that uses an electromagnetic wave, the time-of-flight sensor 132 determines the distance by multiplying the elapsed time (t) by the speed of light (c) and dividing the result by two, as depicted in Equation 1, above. Other types of time-of-flight sensors may utilize other techniques for determining the distance, and the present example is for illustration only.

After measuring the signal intensities and determining the distance, the time-of-flight sensor 132 sends compensated signal intensity values 504 and the distance 502 to the time-of-flight sensor module 136. The time-of-flight sensor 132 may send the compensated signal intensity values 504 and the distance 502 to the time-of-flight sensor module 136 asynchronously (e.g., periodically and without a corresponding request) or in response to a request from the time-of-flight sensor module 136.

After receiving the compensated signal intensity values 504 and the distance 502, the time-of-flight sensor module 136 determines whether the signal 212 is a near-field or far-field signal. To determine whether the signal 212 is a near-field or far-field signal, the time-of-flight sensor module 136 determines whether the distance 502 is less than or equal to a near-field threshold. If the distance 502 is less than or equal to the near-field threshold, the time-of-flight sensor module 136 determines that the signal 212 is a near-field signal. If the distance 502 is greater than the near-field threshold, the time-of-flight sensor module 136 determines that the signal 212 is a far-field signal.

In this example, the time-of-flight sensor 132 detects the signal 212A. The distance travelled by the signal 212A is less than the near-field threshold, thus resulting in the time-of-flight sensor module 136 determining that the signal 212A is a near-field signal.

After determining that the signal 212A is a near-field signal, the time-of-flight sensor module 136 determines whether the signal 212A is crosstalk. To determine whether the signal 212A is crosstalk, the time-of-flight sensor 132 determines whether the detector activation pattern, based on the compensated signal intensity values 504, meets the criteria for a crosstalk activation pattern. For example, the criteria for a crosstalk activation pattern may specify that a certain number of the detectors are activated and that the compensated signal intensity values 504 for the activated detectors have the same order of magnitude. In this example, the time-of-flight sensor module 136 determines that the detector activation pattern meets the criteria for a crosstalk activation pattern and thus determines that the signal 212A is crosstalk.

Because the crosstalk compensation value 138 is used to mitigate the impact of crosstalk on a signal detected by the time-of-flight sensor 132, determining that the signal 212A is crosstalk may indicate that the crosstalk compensation value 138 is too low. Thus, in at least one embodiment, in response to determining that the detected signal 212A is crosstalk, the time-of-flight sensor module 136 increases the crosstalk compensation value 138 by a crosstalk compensation increment value 506. The particular increase applied to the crosstalk compensation value 138 can vary between implementations. In some implementations, the crosstalk compensation increment value 506 may be a percentage of the current crosstalk compensation value 138 or a fixed value. For example, the crosstalk compensation increment value 506 may be a fixed value of '100'. Thus, each time the time-of-flight sensor module 136 determines that a received signal is crosstalk, the time-of-flight sensor module 136 may increment the crosstalk compensation value 138 by 100.

In some implementations, the crosstalk compensation increment value 506 may be dynamically determined. For example, the time-of-flight sensor module 136 may determine that the crosstalk compensation increment value 506 is equal to the difference between the average of the compensated signal intensity values 504 and the signal threshold 404. Thus, if the signal threshold 404 is 10 and the average of the compensated signal intensity values 504 is 15, the crosstalk compensation increment value 506 would be 5.

After the time-of-flight sensor module 136 increments the crosstalk compensation value 138, the time-of-flight sensor module 136 sends the incremented crosstalk compensation value 138 to the time-of-flight sensor 132 for use on subsequent distance measurements.

In addition to increasing the crosstalk compensation value 138, the time-of-flight sensor module 136 indicates that the distance 502 is associated with crosstalk. If the time-of-flight sensor module 136 receives a request for a distance determined by the time-of-flight sensor 132, the time-of-flight sensor module 136 will not send a distance that has been determined to be crosstalk in response to the request. The time-of-flight sensor module 136 may indicate that a distance is associated with crosstalk by setting a flag associated with the distance, discarding the distance, overwriting the distance with another value, etc.

Figure 5B:
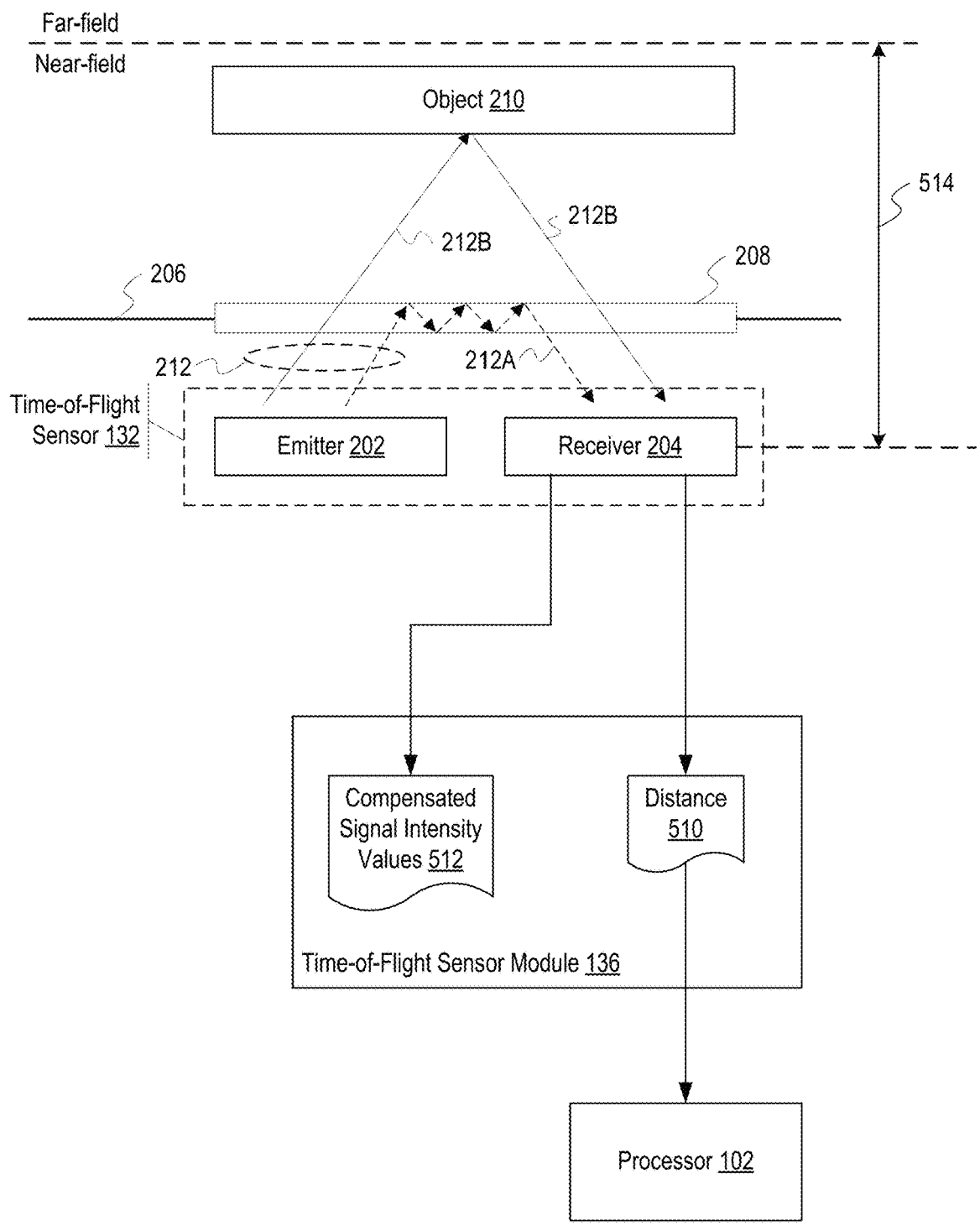
FIG. 5B depicts example operations for identifying a near-field non-crosstalk signal, according to one or more embodiments.

FIG. 5B depicts example operations for identifying a near-field non-crosstalk signal, according to one or more embodiments. FIG. 5B depicts the processor 102, the time-of-flight sensor 132, including the emitter 202 and receiver 204, the mobile device case 206, the cover glass 208, and the object 210. FIG. 5B further depicts the time-of-flight sensor module 136, the crosstalk compensation value 138, and the near-field threshold 514.

In this example, the time-of-flight sensor 132 detects the signal 212B in the same or similar manner as detecting the crosstalk signal 212A, as described in relation to FIG. 5A. After detecting the signal 212B, the time-of-flight sensor 132 sends the compensated signal intensity values 512 and the distance 510 to the time-of-flight sensor module 136.

After receiving the distance 510, the time-of-flight sensor module 136 determines that the received signal (signal 212B) is a near-field signal based, at least in part, on the distance 510. In particular, the time-of-flight sensor module 136 determines that the distance 510 is less than or equal to the near-field threshold 514.

The time-of-flight sensor module 136 determines that the received signal (signal 212B) is not crosstalk based, at least in part, on the compensated signal intensity values 512. In particular, the time-of-flight sensor module 136 determines whether the detector activation pattern corresponding to the received signal meets the criteria for a crosstalk activation pattern. If the detector activation pattern corresponding to the received signal 212B does not meet the criteria for a crosstalk activation pattern, the time-of-flight sensor module 136 determines that the received signal is not crosstalk, but instead non-crosstalk signal 212B. For example, the criteria for a crosstalk activation pattern may be that a threshold number or percentage of detectors are activated and the compensated signal intensity values 512 have the same order of magnitude. Thus, a detector activation pattern would not meet the criteria for a crosstalk activation pattern if fewer detectors than the threshold number or percentage of detectors are activated or if the order of magnitude of the compensated signal intensity values 512 are different. The number of activated detectors can be determined by determining the count of detectors that have a compensated signal intensity value greater than the signal threshold 404.

In this example, the detector activation pattern does not meet the criteria for a crosstalk activation pattern and thus the time-of-flight sensor module 136 determines that the signal 212B is not crosstalk. Because the signal 212B is not crosstalk, the time-of-flight sensor module 136 determines that the signal 212B corresponds to a signal reflecting off a valid object (e.g., the object 210) and makes the distance 510 available for other components, such as the processor 102, that utilizes the distance 510 to the object 210 in one or more other processes. The time-of-flight sensor module 136 may send the distance 510 to other components asynchronously (i.e., "push" the distance 510 to other components without a corresponding request from the other components) or in response to a request from the other components. In some implementations, instead of making the distance 510 available to other components, the time-of-flight sensor module 136 may make an aggregated distance available to other components. For example, the time-of-flight sensor module 136 may average the distance 510 with one or more previously received distances, use the distance 510 to calculate a median distance of a set of distances, etc.

The further away the object 210 is from the time-of-flight sensor 132, the lower the signal intensity of a detected signal that reflects off the object 210 is. If the signal intensity of a received signal decreases below a certain point or the crosstalk compensation value 138 increases above a certain point, the compensated signal intensity values 512 will fall under the signal threshold 404. For example, if a detector signal intensity value is20, the signal threshold 404 is 15, and the crosstalk compensation value is 10, the corresponding compensated signal intensity value is 10. Because the compensated signal intensity value (10) is less than the signal threshold (15), the associated detector is considered inactive.

Because the crosstalk compensation value 138 lowers the signal intensity values, a crosstalk compensation value 138 that is too high may lower the maximum distance that can be detected by the time-of-flight sensor 132 ("expected maximum ranging distance"). To determine if the crosstalk compensation value 138 is too high, the time-of-flight sensor module 136 can use a distance history 522 to track the actual maximum ranging distance. If the time-of-flight sensor module 136 determines that the actual maximum ranging distance is less than the expected maximum ranging distance, the time-of-flight sensor module 136 can lower the crosstalk compensation value 138.

Figure 5C:
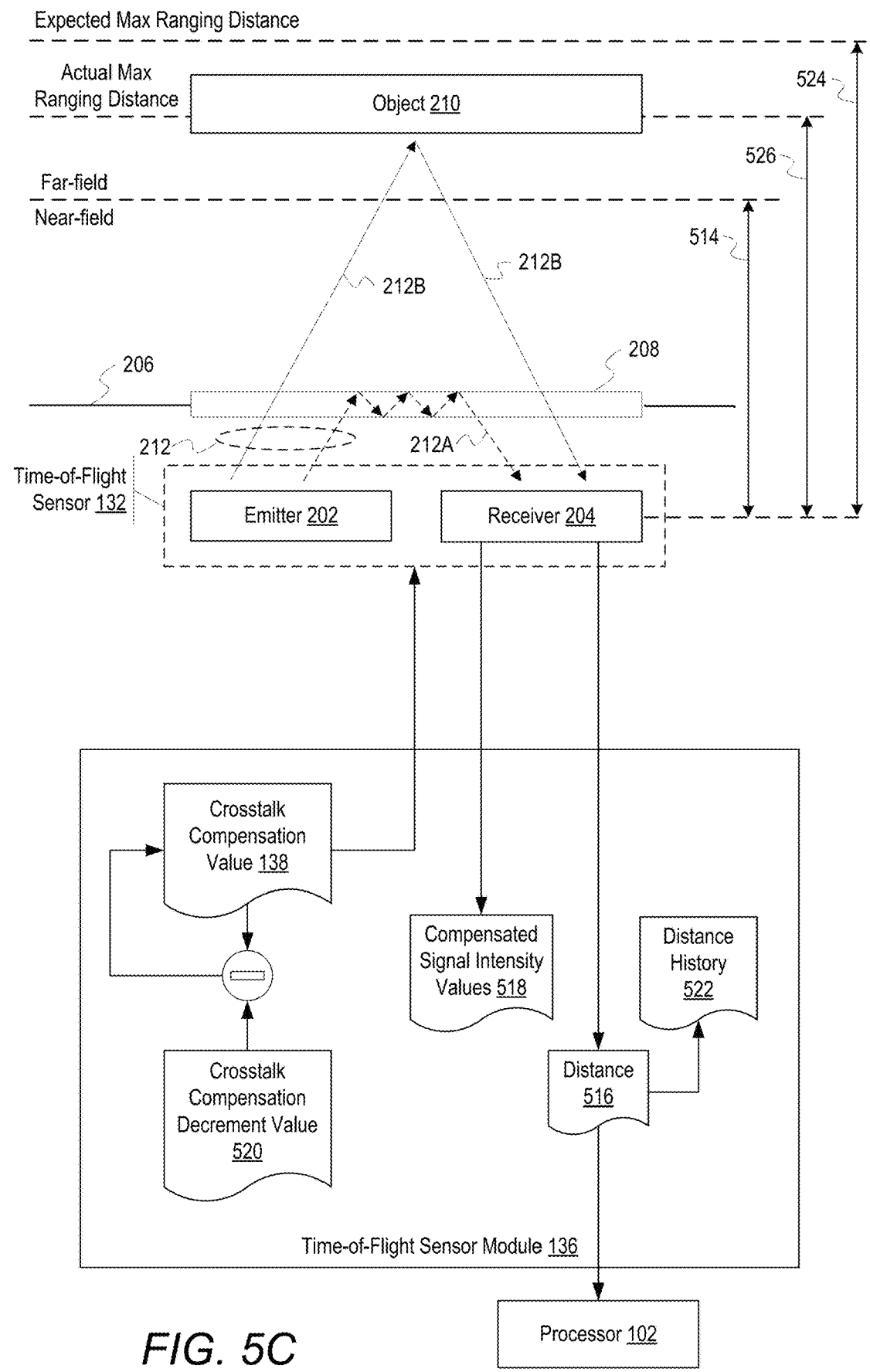
FIG. 5C depicts example operations for determining whether an actual maximum ranging distance of a time-of-flight sensor is less than an expected maximum ranging distance of the time-of-flight sensor, according to one or more embodiments.

FIG. 5C depicts example operations for determining whether an actual maximum ranging distance of a time-of-flight sensor is less than an expected maximum ranging distance of the time-of-flight sensor, according to one or more embodiments. FIG. 5C depicts the processor 102, the time-of-flight sensor 132, including the emitter 202 and receiver 204, the mobile device case 206, the cover glass 208, and the object 210. FIG. 5C further depicts the time-of-flight sensor module 136, the crosstalk compensation value 138, the near-field threshold 514, an expected maximum ranging distance 524, and an actual maximum ranging distance 526.

In this example, the time-of-flight sensor 132 detects the signal 212B in the same or similar manner as detecting the crosstalk signal 212A, as described in relation to FIG. 5B. After detecting the signal 212B, the time-of-flight sensor 132 sends the compensated signal intensity values 518 and the distance 516 to the time-of-flight sensor module 136.

After receiving the distance 516, the time-of-flight sensor module 136 determines that the signal 212B is a far-field signal based, at least in part, on the distance 516. In particular, the time-of-flight sensor module 136 determines that the distance 516 is greater than the near-field threshold 514.

In this particular example, the time-of-flight sensor module 136 determines that the signal 212B is a far-field signal and thus not crosstalk. Because the signal 212B is not crosstalk, the time-of-flight sensor module 136 makes the distance 516 available for other components, such as the processor 102, and stores the distance 516 in the distance history 522.

The time-of-flight sensor module 136 further determines whether the actual maximum ranging distance 526 of the time-of-flight sensor 132 is less than the expected maximum ranging distance 524 of the time-of-flight sensor 132. In this example, the time-of-flight sensor module 136 determines whether the actual maximum ranging distance 526 is less than the expected maximum ranging distance 524 by determining whether a distance stored in the distance history 522 is equal to or greater than the expected maximum ranging distance 524. If a distance stored in the distance history 522 is not equal to or greater than the expected maximum ranging distance 524, the time-of-flight sensor module 136 decreases the crosstalk compensation value 138 by the crosstalk compensation decrement value 520.

After decrementing the crosstalk compensation value 138 by the crosstalk compensation decrement value 520, the time-of-flight sensor module 136 sends the decremented crosstalk compensation value 138 to the time-of-flight sensor 132 for use on subsequent distance measurements.

The use of the distance history 522 may vary between implementations. For example, the time-of-flight sensor module 136 may determine whether the actual maximum ranging distance 526 is less than the expected maximum ranging distance after a particular number of far-field measurements have been made, after a particular amount of time has passed, etc.

Although FIGS. 5A, 5B, and 5C depict the processor 102 and the time-of-flight sensor module 136 as separate components, the time-of-flight sensor module 136 may operate as a component of the processor, such as code executing on the processor. Similarly, the time-of-flight sensor module 136 may be implemented within the time-of-flight sensor 132 itself or as an independent component (e.g., a time-of-flight sensor controller). Similarly, in some implementations the time-of-flight sensor 132 may perform some of the operations performed by the time-of-flight sensor module 136 in this example and vice versa. For example, instead of modifying the crosstalk compensation value 138, the time-of-flight sensor module 136 may send a signal to the time-of-flight sensor 132 and the time-of-flight sensor 132 may increment or decrement the crosstalk compensation value 138 itself. As another example, in some implementations the time-of-flight sensor 132 may send the raw signal intensity values to the time-of-flight sensor module 136 and the time-of-flight sensor module 136 may generate the compensated signal intensity values.

Figure 6:
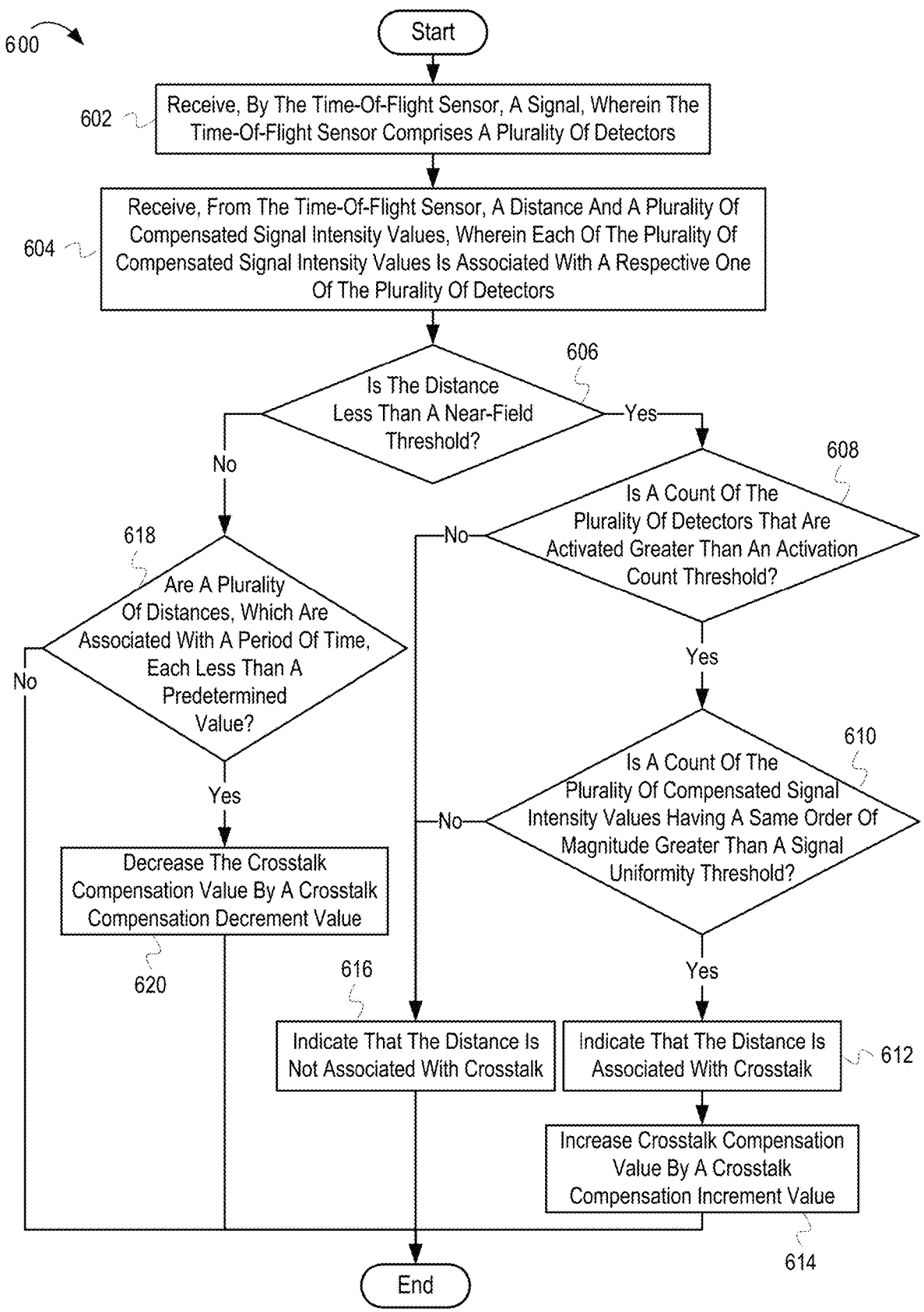
FIG. 6 depicts a method of determining whether a signal is crosstalk and updating a crosstalk compensation value, according to one or more embodiments.

FIG. 6 depicts a method 600 of determining whether a signal is crosstalk and updating a crosstalk compensation value, according to one or more embodiments. The method 600 may be performed by a mobile device 100 or any suitable component. For example, one or more of the processes of the method 600 described in FIG. 6 may be performed by a processor (e.g., processor 102) executing program code of the time-of-flight sensor module 136 associated with a mobile device (e.g., mobile device 100).

The method 600 begins at block 602. At block 602, the time-of-flight sensor 132, which comprises a plurality of detectors, receives a signal. At block 604, the processor 102 and/or the time-of-flight sensor module 136 receives, from the time-of-flight sensor 132, a distance and a plurality of compensated signal intensity values. Each of the plurality of compensated signal intensity values is associated with a respective one of the plurality of detectors. At block 606, the processor 102 and/or the time-of-flight sensor module 136 determines whether the distance is less than a near-field threshold. If the processor 102 and/or the time-of-flight sensor module 136 determines that the distance is less than the near-field threshold, the method 600 proceeds to block 608. If the processor 102 and/or the time-of-flight sensor module 136 determines that the distance is not less than the near-field threshold, the method 600 proceeds to block 618.

At block 608, the processor 102 and/or the time-of-flight sensor module 136 determines whether a count of the plurality of detectors that are activated is greater than an activation count threshold. In one or more implementations, determining whether a count of the plurality of detectors that are activated is greater than an activation count threshold can comprise determining a count of the plurality of detectors having a signal intensity value greater than a signal threshold. If the count of the plurality of detectors that are activated is greater than the activation count threshold, the method 600 proceeds to block 610. If the count of the plurality of detectors that are activated is not greater than the activation count threshold, the method 600 proceeds to block 616.

At block 610, the processor 102 and/or the time-of-flight sensor module 136 determines whether a count of the plurality of compensated signal intensity values having a same order of magnitude is greater than a signal uniformity threshold. If the count of the compensated signal intensity values having the same order of magnitude is greater than the signal uniformity threshold, the method 600 proceeds to block 612. If the count of the plurality of compensated signal intensity values having the same order of magnitude is not greater than the signal uniformity threshold, the method 600 proceeds to block 616.

At block 612, the processor 102 and/or the time-of-flight sensor module 136 indicates that the distance is associated with crosstalk. Indicating that the distance is associated with crosstalk can include setting a flag associated with the distance, discarding the distance, overwriting a storage location containing the distance, etc. At block 614, the processor 102 and/or the time-of-flight sensor module 136 increases a crosstalk compensation value by a crosstalk compensation increment value. The particular operations performed to increase the crosstalk compensation value can vary. For example, the crosstalk compensation increment value may be a constant value that is added to the crosstalk compensation value or may be a factor that the crosstalk compensation value is multiplied by. After increasing the crosstalk compensation value, the method 600 ends.

If the processor 102 and/or the time-of-flight sensor module 136 determines, at block 608, that the count of the plurality of detectors that are activated is not greater than the activation count threshold, the method 600 proceeds to block 616. If the processor 102 and/or the time-of-flight sensor module 136 determines, at block 610, that the count of the activated signal intensity values having the same order of magnitude is not greater than the signal uniformity threshold, the method 600 also proceeds to block 616. At block 616, the processor 102 and/or the time-of-flight sensor module 136 indicates that the distance is not associated with crosstalk. Indicating that the distance is not associated with crosstalk can include setting a flag associated with the distance, storing the distance for future use, providing the distance to another component, etc. After indicating that the distance is not associated with crosstalk, the method 600 ends.

If the processor 102 and/or the time-of-flight sensor module 136 determines, at block 606, that the distance is not less than the near-field threshold, the method 600 proceeds to block 618. At block 618, the processor 102 and/or the time-of-flight sensor module 136 determines whether a plurality of distances, which are associated with a period in time, are each less than a predetermined value. If the processor 102 and/or the time-of-flight sensor module 136 determines that the plurality of distances are each less than the predetermined value, the method 600 proceeds to block 620. If the processor 102 and/or the time-of-flight sensor module 136 determines that the plurality of distances associated with the period of time are not each less than the predetermined value, the method 600 ends.

At block 620, the processor 102 and/or the time-of-flight sensor module 136 decreases the crosstalk compensation value by a crosstalk compensation decrement value. The particular operations performed to decrease the crosstalk compensation value can vary. For example, the crosstalk compensation decrement value may be a constant value that is subtracted from the crosstalk compensation value or may be a factor that the crosstalk compensation value is multiplied by. After the processor 102 and/or the time-of-flight sensor module 136 decreases the crosstalk compensation value, the method 600 ends.

In the above-described method of FIG. 6, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims. For example, although the operations at blocks 608 and 610 are illustrated as being performed sequentially, they may be performed in parallel or in reverse order.

Although the examples described herein refer to a mobile device 100, aspects of the disclosures herein can be performed by any device capable of performing the operations described herein. Examples of other devices that may be capable of performing the operations described herein include, but are not limited to proximity sensors (e.g., motion detectors), portable and desktop computers, televisions, etc. As a more specific example, a video projector may include a time-of-flight sensor that determines the distance between the video projector and a wall, allowing the video projector to automatically focus a lens.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C" is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. A method comprising:
   receiving, from a time-of-flight sensor of a device, a first distance and a first plurality of signal intensity values, wherein the time-of-flight sensor comprises a plurality of detectors and each of the first plurality of signal intensity values is associated with a respective one of the plurality of detectors;
   determining, by the device, whether the first distance is less than a near-field threshold;
   in response to determining that the first distance is less than the near-field threshold, determining whether the first distance is associated with crosstalk based, at least in part, on first characteristics of the first plurality of signal intensity values;
   in response to determining that the first distance is associated with crosstalk, indicating that the first distance is associated with crosstalk;
   receiving, from the time-of-flight sensor, a second distance and a second plurality of signal intensity values, wherein each of the second plurality of signal intensity values is associated with a respective one of the plurality of detectors;
   determining, by the device, whether the second distance is less than the near-field threshold;
   in response to determining that the second distance is less than the near-field threshold, determining whether the second distance is associated with crosstalk based, at least in part, on second characteristics of the second plurality of signal intensity values; and
   in response to determining that the second distance is not associated with crosstalk, indicating that the second distance is not associated with crosstalk.

2. The method of claim 1, wherein determining whether the first distance is associated with crosstalk comprises at least one of:
   determining whether a count of the plurality of detectors that are activated is greater than an activation count threshold; and
   determining whether a count of the signal intensity values having a same order of magnitude is greater than a signal uniformity threshold.

3. The method of claim 2, wherein determining whether a count of the plurality of detectors that are activated is greater than the activation count threshold comprises determining a count of the plurality of detectors having a signal intensity value greater than a signal threshold.

4. The method of claim 1, further comprising increasing a crosstalk compensation value in response to determining that the first distance is associated with crosstalk by determining compensated signal intensity values by applying a crosstalk compensation value to the signal intensity values associated with each of the detectors, the crosstalk compensation value being utilized to decrease an impact of crosstalk on a received signal.

5. The method of claim 1, further comprising:
receiving a third distance from the time-of-flight sensor;
determining whether the third distance is less than the near-field threshold;
in response to determining that the third distance is not less than the near-field threshold, determining whether an actual maximum ranging distance is less than a predetermined value; and
in response to determining that the actual maximum ranging distance is less than the predetermined value, decreasing a crosstalk compensation value.

6. The method of claim 5, wherein determining whether the actual maximum ranging distance is less than the predetermined value comprises determining whether a plurality of distances are each less than the predetermined value, wherein the plurality of distances are associated with a period in time.

7. A device comprising:
a time-of-flight sensor comprising an emitter and a receiver, the receiver comprising a plurality of detectors for detecting a reflection of a signal emitted by the emitter; and
at least one processor that executes program code, which enables the device to:
receive, from the time-of-flight sensor, a first distance and a first plurality of signal intensity values, wherein each of the first plurality of signal intensity values is associated with a respective one of the plurality of detectors;
determine whether the first distance is less than a near-field threshold;
in response to a determination that the first distance is less than the near-field threshold, determine whether the first distance is associated with crosstalk based, at least in part, on first characteristics of the first plurality of signal intensity values;
in response to a determination that the first distance is associated with crosstalk, indicate that the first distance is associated with crosstalk;
receive, from the time-of-flight sensor, a second distance and a second plurality of signal intensity values, wherein each of the second plurality of signal intensity values is associated with a respective one of the plurality of detectors;
determine whether the second distance is less than the near-field threshold;
in response to a determination that the second distance is not less than the near-field threshold, determine whether the second distance is associated with crosstalk based, at least in part, on second characteristics of the second plurality of signal intensity values; and
in response to a determination that the second distance is not associated with crosstalk, indicate that the second distance is not associated with crosstalk.

8. The device of claim 7, wherein the device is further enabled to, in response to a determination that the first distance is associated with crosstalk, increase a crosstalk compensation value wherein the device determines compensated signal intensity values by applying a crosstalk compensation value to the signal intensity values associated with each of the detectors, the crosstalk compensation value being utilized to decrease an impact of crosstalk on a received signal.

9. The device of claim 7, wherein the device is further enabled to:
receive a third distance from the time-of-flight sensor;
determine whether the third distance is less than the near-field threshold;
in response to a determination that the third distance is not less than the near-field threshold, determine whether an actual maximum ranging distance is less than a predetermined value; and
in response to a determination that the actual maximum ranging distance is less than the predetermined value, decrease a crosstalk compensation value.

10. The device of claim 9, wherein to determine whether the actual maximum ranging distance is less than the predetermined value the device determines whether a plurality of distances are each less than the predetermined value, wherein the plurality of distances are associated with a period of time.

11. A computer program product comprising:
a non-transitory computer readable storage device with program code stored thereon which, when executed by at least one processor of a device, enables the device to:
receive, from a time-of-flight sensor comprising a plurality of detectors, a first distance and a first plurality of signal intensity values, wherein each of the first plurality of signal intensity values is associated with a respective one of the plurality of detectors;
determine whether the first distance is less than a near-field threshold;
in response to a determination that the first distance is less than the near-field threshold, determine whether the first distance is associated with crosstalk based, at least in part, on first characteristics of the first plurality of signal intensity values;
in response to a determination that the first distance is associated with crosstalk, indicate that the first distance is associated with crosstalk;
receive, from the time-of-flight sensor, a second distance and a second plurality of signal intensity values, wherein each of the second plurality of signal intensity values is associated with a respective one of the plurality of detectors;
determine whether the second distance is less than a near-field threshold;
in response to a determination that the second distance is less than the near-field threshold, determine whether the second distance is associated with crosstalk based, at least in part, on second characteristics of the second plurality of signal intensity values; and
in response to a determination that the second distance is not associated with crosstalk, indicate that the second distance is not associated with crosstalk.

12. The computer program product of claim 11, wherein the program code which enables the device to determine whether the first distance is associated with crosstalk comprises program code which enables the device to perform at least one of:
determine whether a detector activation pattern corresponding to a received signal meets a criteria for a crosstalk activation pattern;
determine whether a count of the plurality of detectors that are activated is greater than an activation count threshold; and
determine whether a count of the first plurality of signal intensity values having a same order of magnitude is greater than a signal uniformity threshold.

13. The computer program product of claim 12, wherein the program code which enables the device to determine whether a count of the plurality of detectors that are activated is greater than the activation count threshold comprises program code which enables the device to determine a count of the plurality of detectors having a signal intensity value greater than a signal threshold.

14. The computer program product of claim 11, wherein the program code further comprises program code to increase a crosstalk compensation value in response to a determination that the first distance is associated with crosstalk by triggering the device to determine compensated signal intensity values by applying a crosstalk compensation value to the signal intensity values associated with each of the detectors, the crosstalk compensation value being utilized to decrease an impact of crosstalk on a received signal.

15. The computer program product of claim 11, wherein the program code further comprises program code to:
receive a third distance from the time-of-flight sensor;
determine whether the third distance is less than the near-field threshold;
in response to a determination that the third distance is not less than the near-field threshold, determine whether an actual maximum ranging distance is less than a predetermined value; and
in response to a determination that the actual maximum ranging distance is less than the predetermined value, decrease a crosstalk compensation value.

16. The computer program product of claim 15, wherein the program code which enables the device to determine whether the actual maximum ranging distance is less than the predetermined value comprises program code which enables the device to determine whether a plurality of distances are each less than the predetermined value, wherein the plurality of distances are associated with a period of time.

17. The method of claim 1, further comprising:
in response to receiving a request for a distance determined by the time-of-flight sensor when the time-of-flight sensor indicates the distance is associated with crosstalk, not sending the distance in response to the request.

18. The method of claim 1, wherein:
indicating the distance is associated with crosstalk comprises at least one of setting a flag, discarding the distance, and overwriting the distance with another value.

19. The device of claim 7, wherein to determine whether the first distance is associated with crosstalk, the device performs at least one of:
determines whether a detector activation pattern corresponding to a received signal meets a criteria for a crosstalk activation pattern;
determines whether a count of the plurality of detectors that are activated is greater than an activation count threshold; and
determines whether a count of the first plurality of signal intensity values having a same order of magnitude is greater than a signal uniformity threshold.

20. The device of claim 19, wherein to determine whether a count of the plurality of detectors that are activated is greater than the activation count threshold, the device determines a count of the plurality of detectors having a signal intensity value greater than a signal threshold.

* * * * *